United States Patent Office 3,071,979
Patented Jan. 8, 1963

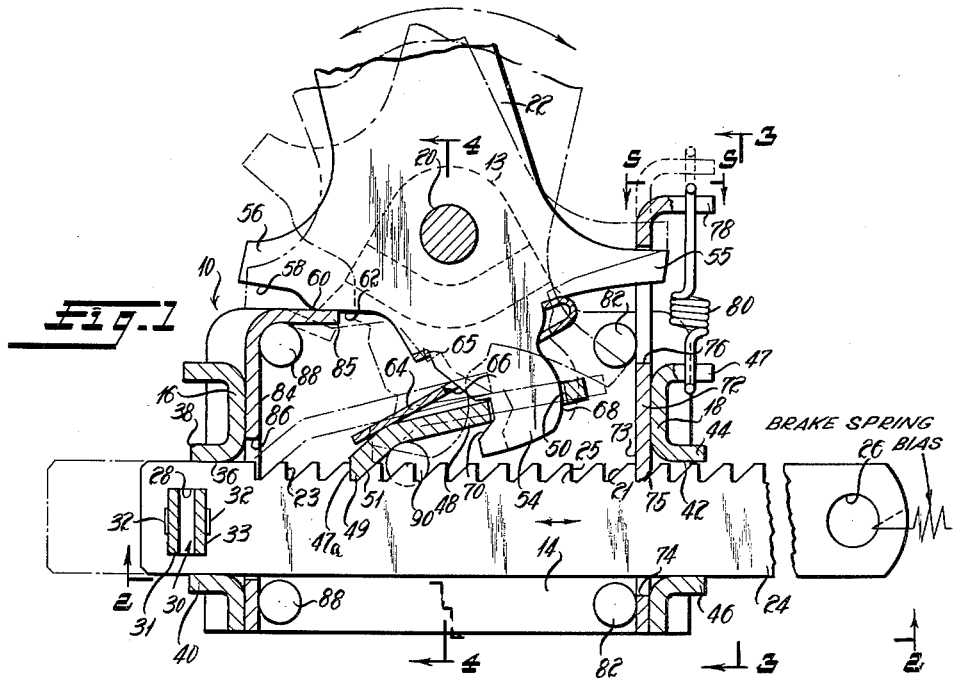

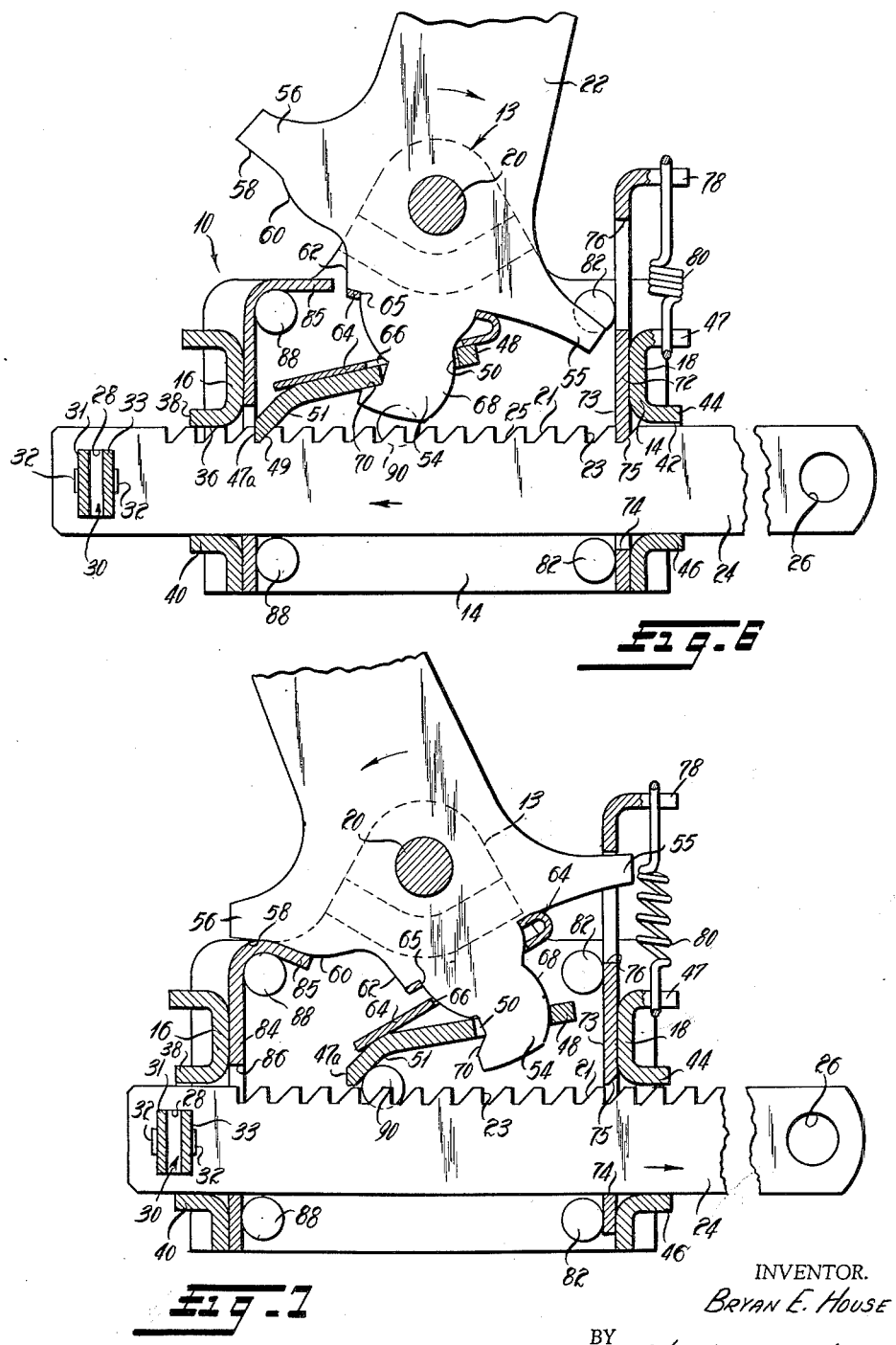

3,071,979
HAND BRAKE LEVER—RATCHET TYPE
Bryan E. House, Birmingham, Mich., assignor to Rockwell-Standard Corporation, Coraopolis, Pa., a corporation of Pennsylvania
Filed Sept. 8, 1959, Ser. No. 838,512
12 Claims. (Cl. 74—141.5)

This invention relates to improvements in hand brake shifting, locking and releasing means to actuate the emergency or parking brake of a motor vehicle and more particularly to a manually operated brake setting device of the progressive pawl and ratchet type.

In the preferred embodiment of the invention it is applied to an emergency or parking brake for a motor vehicle where the maximum actuating force may be delivered to the brake without the necessity of keeping it in adjustment, and a simple yet highly efficient actuating mechanism utilizes the brake lining to its full extent. It can be easily and positively set and equally easily released by motion of a single lever.

Common types of hand brake control mechanism in use today employ a variety of shifting, holding and releasing mechanisms using wobble plates, gripper plates, pawl and ratchet assemblies and others. Most of those mechanisms employ a separate releasing means to release the brake setting mechanism.

The present invention contemplates an essentially universal brake setting and releasing mechanism for the hand lever of an emergency brake in which a single actuation lever effects both setting and releasing by simply moving the lever in the proper direction.

The preferred embodiment of the invention comprises a brake lever housing into which slidably extends a toothed rod or rack bar connected to the brake actuating linkage and which is moved into either actuating or releasing position by an actuating lever pivotally secured on the housing and rockably carrying a shift dog or pawl to selectively coact with the teeth of the toothed rod. A vertically slidable holding plate releasably retains the toothed shift rod in any advanced actuating position by engaging the nearest tooth independently of movement of the actuating lever. An integral spur on the lever disengages the holding plate from the rack during the release stroke of the actuating lever and simultaneously the shift dog or pawl is disengaged by riding up a fixed abutment on the housing.

Accordingly, it is the major object of the invention to provide in a hand brake lever mechanism, actuating and releasing means in which release of the mechanism is made by essentially the same parts required for actuation.

Another object of the invention is the provision in a pawl and ratchet mechanism of a slidable spring loaded holding plate to instantaneously and positively interlock with adjacent teeth of the rack after each intermittent stroke of the lever in a certain direction.

A further object of the present invention is the provision of a single universal lever in a pawl and ratchet mechanism in which the pawl is rockably attached to the lever and resiliently maintained in engagement with the teeth of the ratchet in the actuating position of the lever, but capable of riding over the rack teeth during the reverse stroke of the lever.

Still another object of the present invention is the provision of a hand lever for actuation of a pawl and ratchet mechanism having a projecting spur thereon to lift a slidable holding plate out of latching engagement with the ratchet teeth on a slidable rack during the release movement of the lever.

A still further object of the present invention is the provision of a stationary abutment within a pawl and ratchet mechanism housing to lift a rockable pawl out of engagement with a slidable rack substantially simultaneously with disengagement of a holding plate from the rack during the release movement of a lever extending into the housing.

Another object of the present invention is in a hand brake assembly having an actuating lever the provision of a relatively strong feeler spring the initial force of which has to be overcome by movement of the lever in order to release mechanism which efficiently prevents an accidental release of the brake.

Other objects and novel features will be apparent from the following description in connection with the appended drawings which show a preferred embodiment and in which:

FIGURE 1 is a longitudinal cross section partly in elevation showing the housing of the actuating mechanism with the actuating lever disposed in neutral brake released position in full lines;

FIGURE 2 is a bottom plan view partly in section along line 2—2 of FIGURE 1;

FIGURE 3 is a rear end view of the lever mechanism housing partly in section along line 3—3 of FIGURE 1;

FIGURE 4 is a vertical cross section through the same lever mechanism housing along line 4—4 of FIGURE 1;

FIGURE 5 is a top view of the holding plate of the mechanism of FIGURE 1 looking along line 5—5 of FIGURE 1;

FIGURE 6 shows the mechanism of FIGURE 1 with the parts in brake actuating position; and FIGURE 7 is another similar view of the mechanism of FIGURE 1 but showing the parts in brake release position.

Same reference numerals refer to same parts throughout the description.

The hand lever brake actuating mechanism of the invention is enclosed in a rectangular housing generally indicated at 10.

Housing 10 may be secured at any desired place on an automobile chassis (not shown). Also not shown are certain cooperating parts of the brake and linkages which may be of various construction depending on the type of application. Furthermore this novel lever-actuated ratchet and pawl mechanism is not necessarily limited to an automobile parking brake application as will become evident, although it is primarily intended for such use.

Housing 10 has two longitudinal similar side walls 12 and 14 which are preferably stamped metal plates. Side walls 12 and 14 are rigidly interconnected near both ends by smaller front wall 16 and rear wall 18 of which may be spot-welded or otherwise secured to the side walls.

Side walls 12 and 14 converge towards each other at their upper center portions as shown in FIGURE 4, and are provided at the upstanding center lug 13 with aligned bores to receive a pivot pin 20 to which is attached an actuating lever 22 extending partly into the housing 10.

Longitudinally slidably extending through housing 10 is a rectangular shift rod 24 which is provided at the rear with aperture 26 for attaching it to the usual brake actuating linkage (not shown). The usual brake return spring and linkage pulls rod 24 to the right as indicated in FIGURE 1. Near its front end sliding rod 24 is provided with a rectangular cutout aperture 28 to accommodate the insertion of a generally U-shaped stop and cushion spring 30 (FIGURES 1 and 2). Spring 30 is provided on both legs 31 and 33 with outwardly struck tongues 32, and the free end of shorter leg 31 is bent laterally outwardly at 34 to prevent the spring from slipping out of aperture 28. In this it may be aided by projection 32 of leg 33. The longer leg 33 of spring 30 abuts normally in the neutral or released position of the brake mechanism against the lateral front faces of both side plates 12 and 14 as shown in FIGURE 2. Stop spring 30 prevents the slide rod 24 from being pulled out of the housing 10 and also cushionings the return movement of the slide rod. Projections 32 also prevent spring 30 from passing through aperture 28.

The end walls 16 and 18 are provided with outwardly struck similar aligned rectangular apertures 36 and 42 respectively to permit the sliding rod 24 to pass therethrough. The outwardly extending flat parallel flanges 38 and 40 of aperture 36 and 44 and 46 of aperture 42 provide a support and aligning guide means for the slide rod 24 as shown in FIGURES 1 and 3.

Within housing 10 rod 24 is provided along its upper edge with serrations or teeth 25 whose slant is directed rearwardly and which in the neutral or activating position are engaged by a dog or pawl 48 rockably connected to lever 22. Pawl 48 has an aperture 50 and a hook-shaped leg 54 of lever 22 extends into aperture 50.

The lower end of lever 22 below the pivot 20 is divided into three legs provided for different purposes. The forward leg 56 is provided at its underside with three consecutive bearing surfaces, of which the straight forward section 58 develops into a curved section 60 and into a straight section 62 for a purpose to appear.

The rearward leg 55 comprises a spur extending into an aperture 76 of a holding plate 72 to be described. The center leg 54 rockably carries on its hooked lower end the pawl 48 which is urged toward engagement with teeth 25 of the sliding rack 24 by a compressed light hair-pin type spring 64 that has apertures 65 and 66 fitting over center leg 54, the longer arm of spring 64 depressing pawl 48 downwardly toward the rack teeth 25. Pawl holding spring 64 is of relatively light load to be easily depressed when the pawl 48 is lifted out of engagement with teeth 25 by rocking lever 22.

Center leg 54 which is on the longitudinal center line and above the sliding rack 24 is of such dimension as to clear the rack teeth 25 during the actuating movement of the lever 22 (FIGURE 6) and is provided with a curved rear bearing surface 68 to facilitate rocking of the pawl 48. The forward lower end of center leg 54 as above pointed out is formed like a hook providing an abutting surface 70 for engaging the underside of pawl 48 to prevent lever 22 from further movement at the end of an actuation stroke as shown in FIGURE 6.

Adjacent and inside the rear end wall 18 is slidingly located a holding plate 72 having an aperture 74 to permit the sliding rack 24 to pass therethrough and another larger, also rectangular aperture 76 above it to allow sufficient room for passage of the rearward leg 55 of lever 22. The upper inside face of aperture 74 at 75 is shaped to conform to the inclined face 21 of the rack teeth 25. The upper end of holding plate 72 extends outwardly of housing 10 and is bent rearwardly at 78 to provide a fastening lug for the hooked upper end of holding plate retraction coil spring 80. The lower end of retraction spring 80 is secured in a similar manner to an upper rearwardly extending flange 47 of rear end wall 18. Retraction spring 80 is of relatively light load and holds the holding plate 72 normally engaged with the teeth 25 of shift rod 24. The holding plate 72 is maintained and slidably guided in its vertical position between the front or inside face of rear wall 18 and four spaced cylindrical abutments 82 which rigidly extend inwardly from both the side walls 12 and 14 opposite from the rear end wall 18.

Adjacent and abutting the inside surface of front end wall 16 extends vertically a single, heavy leaf spring 84 having a rectangular aperture 86 to allow shift rod 24 to freely pass therethrough. The vertical leg of spring 84 is vertically maintained between the inside surface of wall 16 and four cylindrical abutments 88 similar to abutments 82 and extending rigidly inwardly from both side walls 12 and 14.

The upper end 85 of leaf spring 84 is bent rearwardly at right angles around top abutments 88 so as to be horizontal and flush with the upper edges of housing side walls 12 and 14 and provides a stop means for the rearward stroke of lever 22.

Offset from the vertical centerline of pivot 20 and above rack teeth 25, two more rigid cylindrical abutments 90 oppose each other to provide a stationary throw-out ramp for the pawl 48.

FIGURE 1 shows the mechanism in its neutral position with the maximum actuating and releasing positions of the actuating lever 22 and cooperating parts shown in broken lines, which latter positions are more clearly shown in the separate views of FIGURES 6 and 7.

FIGURES 1, 6 and 7 show an actuating lever 22 that is rocked in the clockwise direction for actuation to apply the brake and in the counterclockwise direction for return movement and release of the brake.

In the neutral position of the mechanism shown in FIGURE 1 the rockable shifting pawl 48 has its lower tip 49 which is shaped to conform to the shape of rack teeth 25 in engagement with one of the teeth 25 and resiliently held therein by compression spring 64. The holding plate or latch 72 also has aperture edge 75 in engagement with one of the rack teeth 25 and loosely held there by spring 80. The upper edge of the rearward spur leg 55 of lever 22 at this time abuts the upper inner edge of aperture 76 of the holding plate 72, and the straight bearing surface 62 of the forward leg 56 of lever 22 engages the undeformed section 85 of heavy leaf spring 84.

To actuate this mechanism for setting the brake, lever 22 is rocked clockwise to the FIGURE 6 position whereby the engaged pawl 48 shifts rod 24 to the left in FIGURE 6 a distance in the forward direction. The holding plate 72 ratchets during this movement upon the teeth 25 as permitted by the shape of the teeth and light spring 80 and snaps instantanously into the associated tooth when the lever motion is stopped to positively hold the rod 24 in the shifted position. The amount of the maximum actuating stroke is limited by the slanting surface 70 on the forward portion on the center leg 54 of lever 22 which abuts against the underside of the pawl 48 thus preventing further pivoting and by the pawl 48 itself abutting against the inner face of leaf spring 84.

To return the lever 22 to its initial neutral position, the lever is rocked counterclockwise whereby the pawl 48 ratches back over the teeth 25 as permitted by the tooth shape and the shift rod 24 is held in its advanced position by the holding plate 72 which solidly engages the flat rear tooth face at 23.

Lever 22 can be moved further counterclockwise until the straight bearing surface 62 of the forward leg 56 of the lever comes again to rest upon the bent section 85 of the heavy leaf spring 84 which signals to the operator the end of the return movement of the lever 22. Additional actuating strokes can now be repeated in the same fashion as described until the maximum brake setting of FIGURE 6 is achieved to securely hold the vehicle. It is, of course, not always necessary to return the lever 22 to the limit, or sometimes only one or two additional tooth distances will be required for maximum brake setting.

To release the brake the lever 22 has to be pivoted further counterclockwise as shown in FIGURE 7 against the relatively heavy spring force of the bent spring section 85 of leaf spring 84 which is depressed downwardly by means of the curved bearing section 60 of forward leg 56 of lever 22 until the forward straight section 58 comes to rest upon the bend of leaf spring 84. Simultaneously the rearward spur leg 55 of lever 22 lifts holding plate 72 by abutting against the upper inside of aperture 76 to move plate 72 out of latching engagement with the teeth 25 of the shift rod 24. Also simultaneously, by the same movement of the lever 22, pawl 48 is lifted out of engagement with the teeth 25 of shift rod 24 by inclined surface 51 riding upon the fixed abutment 90 in the center of the housing 10. The shift rod 24 is then free to slide back to its initial position under the pull of the spring in the brake mechanism (not shown), the backward movement being stopped and damped by spring 30 abutting against the lateral front edges of side plates 12 and 14.

The upwardly directed force of spring section 85 returns the lever 22 after the mechanism is completely released to its initial neutral position of FIGURE 1 with the holding plate 72 and pawl 48 again being spring urged into engagement with spaced teeth 25 of the shift rod 24.

The spring force of spring section 85 is strong enough to prevent an accidental release of the mechanism. As will be clear from the foregoing a certain amount of force is required to overcome the counteracting forces of both the heavy leaf spring 84 and holding plate spring 80 and the additional slight resistance of pawl spring 64 which altogether tend to move the lever 22 clockwise into neutral position as is apparent from FIGURE 7.

Thus the invention provides a simple yet dependable and highly efficient speedily operating ratchet and pawl mechanism to progressively incrementally move a shift rod or the like and positively hold the latter advanced after each progressive step, achieved by means operated by a single hand lever which same lever also actuates means to release the mechanism by simply rocking the lever back and forth.

It will be noted that as actuating lever 22 is rocked clockwise, starting with the full line condition of FIGURE 1, a flat pawl face 47a is in longitudinal engagement with a rack flat tooth face 23 that extends at right angles to the direction of movement of rack bar 24. The inclined front face 21 of each rack bar tooth has the same angle as latch bar face 75 and the inclined face 51 of pawl 48, these inclined faces being in contact when the lever 22 is not being moved as shown in FIGURE 1.

Thus when lever 22 rocks clockwise a positive longitudinal push to the left in FIGURE 1 is exerted on the rack bar 24 and tooth faces 21 holding plate 72 up against the tension of spring 80 during movement of the rack. However as soon as the end of a clockwise stroke of lever 22 is reached spring 80 is strong enough to force holding plate 72 into latching engagement with the nearest rack tooth 25 with the flat vertical rear face 73 in full contact with back tooth face 23. The aperture 76 is sufficiently deep vertically that spur leg 55 does not operate holding plate 72 when the lever 22 is rocked clockwise.

It will be observed that as lever 22 rocks clockwise in FIGURE 1 the compressed pawl control spring 64 will progressively expand to provide sufficient relative rocking of pawl 48 with respect to lever leg 54 to maintain full engagement of the pawl tip 49 with the ratchet teeth 25.

During the release operation when lever 22 is moving counterclockwise the inclined pawl face 51 ratchets over the rack teeth until the pawl kickout abutment 90 is reached. Then since both pawl 48 and latch bar 72 are disengaged from the rack, bar 24 is free to be moved all the way rightward in FIGURE 7 to release position by the return spring of the brake (not shown).

Manufacturing of the parts of this novel mechanism is inexpensive because most of the parts as the lever, side plates, end walls, etc. are made from stampings and require no machining.

The herein disclosed novel pawl and ratchet mechanism is primarily intended to be used in connection with the hand brake lever of a parking or emergency brake of a motor vehicle but may be used to the same advantage in other applications as for instance: lifting jacks, wire stretchers, caulking guns, etc.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake assembly having a support, a slidable shift rod on said support oppositely movable in brake applying and brake releasing directions respectively and having means for connecting it to brake mechanism containing spring means biasing said rod toward brake release position, a pivoted actuating lever on said support rockable in strokes in opposite directions about a fixed axis, means movable with the lever for operatively engaging and shifting said rod in the brake applying direction when said lever is rocked about its pivot in a selected direction, means for automatically latching said rod against return movement from said shifted position at the end of each stroke of the lever in said selected direction, means on the lever for releasing said latching means to free said rod for continuous full return to brake release position when the lever is rocked for a single stroke beyond a predetermined position in the opposite direction, and resiliently engageable means on the support and lever for indicating to the operator when said lever approaches said predetermined position when moving in said opposite direction so that he may stop return pivotal movement of the lever and start a new stroke in the selected direction for effecting progressive shift of said rod in brake applying direction without intermediate latch release.

2. In a brake assembly, an actuating lever, a support, means pivotally mounting said lever on said support for rocking movement in strokes in opposite directions about its pivot axis, a shift rod slidably mounted on said support for opposite movement in brake applying and brake release directions respectively at right angles to the pivot axis of said lever and having means for connecting it to brake mechanism including spring means for biasing said rod in brake release direction, ratchet teeth on said shift rod, a pawl rockably mounted on said lever and having a tip adapted to engage said ratchet teeth so that said rod is moved in brake applying direction when said lever is rocked in one direction about its pivot axis, a movably mounted latch member having detent means adapted to engage said ratchet teeth, and a projection rigid with on said lever for engaging and moving said latch member out of engagement with said ratchet teeth when said lever is rocked for a single stroke in the other direction about its pivot axis to release said rod for continuous full return in the brake release direction.

3. In the brake assembly defined in claim 2, said latch member being slidable perpendicular to the direction of movement of said shift rod and being resiliently urged toward said shift rod and means on said support slidably guiding said latch member.

4. In the brake assembly of claim 2, cooperating means on the shift rod and support for dampening the return motion of said shift rod.

5. Control mechanism comprising a support, a bar slidably mounted on said support for movement in opposite directions and having a row of ratchet teeth, an actuating lever pivoted on said support for rocking movement in strokes in opposite directions about its pivot axis, a first projection on said lever, a pawl biased toward said ratchet teeth by a spring mounted on said lever rockably mounted on said lever, said pawl have a tip adapted to engage with said teeth for shifting said bar in one direction when the lever is rocked in a selected direction and for ratcheting over said teeth when the lever is rocked in the direction opposite to the selected direction, said bar being spring biased in the opposite direction from said one direction, a latch member movable to engage said ratchet teeth for ratcheting over said teeth when the bar is being moved in said one direction and for locking said bar against movement in the opposite direction, and a second projection on said lever operable to disengage said latch member from said bar upon predetermined rocking movement of said lever in the direction opposite said selected direction, said latch member disengagement being sufficient during a single stroke of said lever in said direction opposite said selected direction for continuous full return of said bar in said opposite direction.

6. In the mechanism defined in claim 5, means on the support engaging and rocking said pawl out of engagement with said teeth substantially simultaneously with disengagement of said latch member.

7. In the mechanism defined in claim 5, said latch member being slidable normal to the direction of movement of said bar, means on said support slidably guiding said latch member, and a spring resiliently urging said latch member against said bar with light enough force to permit said ratcheting therebetween.

8. In the mechanism defined in claim 5, means on the support resiliently opposing rocking of said lever after said predetermined movement of said lever in said opposite direction.

9. In the mechanism defined in claim 7, said slidable latch member being formed with an aperture into which extends said second projection on said lever.

10. In the mechanism defined in claim 8, said means on the support resiliently opposing lever movement comprising a third projection on said lever and a spring on the support in the path of movement of said third projection.

11. In a control assembly, a support, a shift rod slidably mounted on said support for movement in a forward control effecting direction or in a return control release direction, means resiliently biasing said shift rod to move in said return direction, an actuating lever pivoted on said support and rockable about its pivot axis in forward and back strokes, coacting means on said lever and said rod for advancing said rod in said forward direction as said lever is repeatedly rocked back and forth about its pivot, said rod being progressively advanced in said forward direction during said forward strokes of the lever, latch means for automatically locking said rod in each position of advance, means for operatively separating said coacting means on said lever and said rod upon a single predetermined rocking movement of said lever in its back stroke direction, and coacting means on said lever and said latch means independent of said coacting means on said lever and said rod effective upon said single predetermined rocking movement of said lever in the back stroke direction for substantially simultaneously moving said latch means to release said rod, whereby continuous free return movement of said rod by said resilient means results.

12. In a brake assembly having a support, a shift rod slidably mounted on said support for opposite movement in brake applying and return brake releasing directions respectively, means spring biasing said rod in the brake releasing direction, a manually operated pivoted lever on said support rockable about its pivot axis in opposite directions for brake applying and brake release strokes respectively, coacting means on said lever and said rod effective during repeated opposite strokes of said lever for progressively shifting said rod in the brake applying direction during rocking of the lever in the brake applying stroke direction, means for holding said rod in each said shifted position, means for releasing said rod for substantially instantaneous continuous return movement in the brake release direction actuated by rocking of said lever beyond a predetermined position in its back stroke direction, and coacting engageable means on said lever and support for signalling to the operator approach of said lever to said predetermined position during said back stroke.

References Cited in the file of this patent

UNITED STATES PATENTS

| | | |
|---|---|---|
| 2,051,832 | Edelblute | Aug. 25, 1936 |
| 2,450,596 | Kais | Oct. 5, 1948 |
| 2,674,893 | De Orlow | April 13, 1954 |
| 2,877,661 | Boyer et al. | Mar. 17, 1959 |
| 2,951,679 | Volkert | Sept. 6, 1960 |